United States Patent
Houldcroft et al.

[15] 3,679,863
[45] July 25, 1972

[54] THERMAL CUTTING APPARATUS

[72] Inventors: Peter Thomas Houldcroft, Royston; Arthur Basil Joseph Sullivan, Letchworth, both of England

[73] Assignee: National Research Development Corporation, London, England

[22] Filed: Nov. 10, 1969

[21] Appl. No.: 875,365

[30] Foreign Application Priority Data
Nov. 12, 1968 Great Britain............53,647/68

[52] U.S. Cl. ...........219/121 LM, 219/69 R, 219/121 EM
[51] Int. Cl. ..................................................B23k 9/00
[58] Field of Search...............219/121 L, 121 EB, 69 D

[56] References Cited

UNITED STATES PATENTS

| | | |
|---|---|---|
| 3,131,288 | 4/1964 | Browning...................219/121 P |
| 3,204,076 | 8/1965 | Browning.....................219/70 X |
| 2,526,423 | 10/1950 | Rudorff........................219/69 D X |
| 2,908,799 | 10/1959 | Cresswell et al.................219/69 D |
| 3,388,314 | 6/1968 | Gould.........................219/121 L X |
| 3,469,076 | 9/1969 | Saslawsky...................219/121 L X |
| 3,424,890 | 1/1969 | Van Ruyven.....................219/121 |
| 3,472,998 | 10/1969 | Popick et al......................219/121 |

OTHER PUBLICATIONS

"Gas-Jet Laser Cutting" British Welding Journal 1967 August.
"The Carbon Dioxide Laser" Design Engineering May 1969 pp. 47–49.

Primary Examiner—J. V. Truhe
Assistant Examiner—George A. Montanye
Attorney—Kemon, Palmer & Estabrook

[57] ABSTRACT

To cut paper, timber, fabric etc., with a laser beam, a jet of air (or other gas which is inert in the process) carrying an atomized stream of a liquid coolant is directed on to the moving region of the workpiece at which the laser beam is concentrated. This reduces the spread of charring or tar deposit from the cut along the surfaces of the workpiece.

2 Claims, 1 Drawing Figure

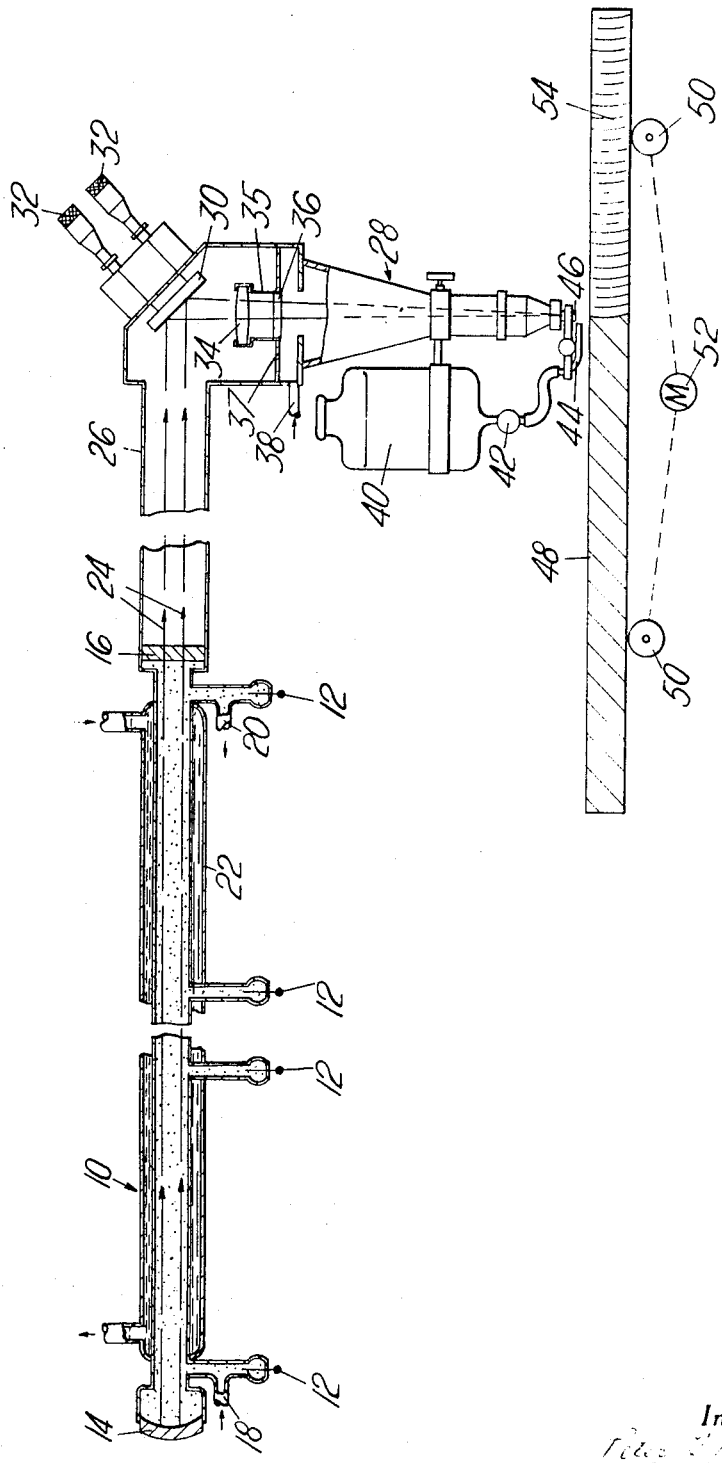

THERMAL CUTTING APPARATUS

Lasers have been used to drill holes in metals and to make cuts in metals and we have suggested the use of lasers with a fluxing agent for cutting non-metals, for example, ceramic material, brick, tile, concrete and glass. There is another class of material for which the laser has not previously been successfully used, namely materials which, when subjected to the laser heat, give rise to decomposition or to the production of a tar distillate. Such materials include timber (including hardboard), carpet, fabric, and paper. If a laser is used to cut any of these materials, their upper and lower surfaces adjacent the cut will be affected by charring or by deposited tar distillates; in addition, the process may give rise to smoke and an unpleasant smell. The severity of these effects varies with the nature and thickness of the workpiece, the power of the laser and the relative speed of the laser and workpiece during cutting.

We have discovered that these disadvantages can be overcome in a very simple manner. According to the present invention, during the relative movement of the laser beam and the workpiece on to which the beam is concentrated, a jet of an inert gas (as hereinafter defined) carrying an atomized stream of a liquid coolant is directed on to the moving region of the workpiece at which the laser beam is concentrated. The gas may be air, argon or nitrogen, for example. The use of this method reduces the spread of charring or tar deposit from the cut along the upper and lower surfaces of the cut portions and also reduces the smoke and smell to negligible proportions. It is envisaged that the liquid used will normally be water but it would also be possible to employ other liquids which provide additional cooling of the top surface and which do not leave a product of decomposition. Thus, the invention enables the laser to cut materials of the kind described without detrimentally affecting the marginal portions adjacent the cut. The rate of cutting can be extremely rapid because of the intensity of the heat at the point at which the laser beam is concentrated. The liquid, as well as acting as a coolant at the edges, may be such as to provide a superheated component in the gas stream to facilitate cutting.

In the preferred apparatus for carrying the invention into effect, the gas stream is introduced into a tube through which passes the laser beam and the liquid coolant is introduced into the gas stream at the outlet of a nozzle at the end of the tube.

In order that the invention may be better understood, one example of apparatus for carrying the invention into effect will now be described with reference to the accompanying drawing.

The apparatus shown employs a carbon dioxide-nitrogen-helium laser 10 having a length of 10 meters and a bore of 30 millimeters. There are five sections to the tube (only two being shown in the drawing) and each section has its own electrodes 12 for connection to an electrical supply. The power supply has a frequency of 50 Hz and provides 20 kV for striking and 9 kV at 45 mA when the laser is running. The laser has a fully-reflecting concave mirror 14 of gold-surfaced stainless steel at one end and a plain semi-reflecting germanium disc 16 at the other end. The concave mirror has a focal length slightly in excess of 10 meters. The gas in which the discharge is to be created flows into the laser body through an inlet 18 and leaves the laser body through an outlet 20. A cooling jacket 22 surrounds the laser body and is fed with a cooling liquid. It should be understood that the design and operation of the laser form no part of the present invention and it will be sufficient for the purposes of the present invention to state that when the laser is in operation a substantially parallel beam 24 of coherent light emerges from the laser through the disc 16.

The beam 24 then enters a mounting tube 26 which carries at its end a laser cutting head 28. The direction of the laser cutting head is perpendicular to the direction of the mounting tube 26 and a mirror 30 is arranged to make an angle of 45° with the incident laser beam to reflect the latter along the cutting head. Adjustable heads 32 control micrometer screws which permit fine adjustment of the angle of the mirror 30. Although only two such screws are shown in the drawing, in practice there is at least one further micrometer screw to permit adjustment of the mirror in a sense perpendicular to the adjustment permitted by the screws shown.

After reflection by the mirror 30, the beam 24 passes through a lens 34. In the apparatus shown the lens is mounted at the upper end of a cartridge 35 at the base of which is a transparent pressure disc 36. The pressure disc fits into a central hole in a shield 37 separating the cutting head 28 from the apparatus enclosing the laser beam in the earlier portion of its path.

Air or an inert gas enters the cutting head through an inlet 38. Generally speaking, it is sufficient to have a single outlet, as shown in the drawing, but if a better distribution of gas is required an annular ring can be formed inside the cutting head to receive the gas entering through the inlet 38. This annular ring will have perforations spaced around its inner margin to permit gas to flow out into the cutting head all round the laser beam.

In the example shown, a bottle 40 containing water is clamped to the cutting head. Water flows from the base of this bottle through a valve 42 and an atomizing jet 44 to emerge immediately below the nozzle 46 of the cutting head. The flow of gas entrains minute droplets of water and carries them in the form of an atomized jet to the surface 48 of the workpiece. The latter is shown supported on rollers 50 and during a cutting operation the rollers are driven by a motor 52 to advance the workpiece past the cutting head in the direction of the arrow. The drawing shows the cut surface 54 ahead of the cutting head.

The quantity of water added should be only sufficient to prevent charring and deposit of tar distillate. Too much water will merely decrease the available energy for cutting, particularly if the water intercepts the laser beam before its impingement on the workpiece. Therefore it is preferred to add water to the outer layers of the gas jet. This is achieved by suitable positioning of the atomizing tube 44.

Where the direction of the cut may change, it may be advantageous to provide more uniform distribution of the liquid droplets around the laser beam. This can be achieved by introducing the water into the end of the nozzle through an inlet directed tangentially to the nozzle, or a swirling jet may be used.

The water feed rates which we have used have been between 50 and 125 ml/min. and usually between 75 and 100 ml/min. The tube 44 had an inside diameter of 0.06 inches and was located at 90° to the gas jet.

In tests conducted with this apparatus using a gas pressure of 5 lbs. per square inch, the following results were obtained. The gas used was argon but air or nitrogen would behave in the same way. In a test with plywood having a thickness of one-quarter inch, a laser of 800 W was used with a cutting speed of 17 feet/minute. Without water vapor there was a bevelled kerf and surface discoloration. When the water was turned on with a flow rate of 100 ml/min., the top surface was clean and the bevel was reduced. If the cutting speed was reduced too greatly (for example to three feet per minute), the surface remains satisfactory but an incomplete cut resulted. This was because the water flow rate was excessive for the cutting speed and reduced the effective power.

In a test on hardboard having a thickness of one eighth inch a laser having a power of 400 W was used with a cutting speed of eight feet per minute. Without the water flow the top surface was discolored and the upper edge of the cut hardboard was rounded. With a water flow of 75 ml/min. the top surface was clean and the kerf had a uniform width. When woollen fabric of one eighth thickness was used as the test material, the laser power was reduced to 250 W with a cutting speed of eight feet per minute. Without water vapor the cut edges were burnt but with a water flow of 50 ml/min. the edges were clean and there was no discoloration even on the kerf.

The expression "inert gas" is intended to include all gases which are inert when used in the method of the present invention (for example, nitrogen or carbon dioxide) and mixtures of gases the use of which in the said method would not rely on an exothermic reaction (for example, air).

We claim:
1. A method of cutting a combustible workpiece comprising, concentrating a laser beam on a combustible workpiece, moving the beam and workpiece relative to one another to cut the workpiece, and directing a jet of gas carrying an atomized stream of a liquid coolant onto the moving region of the workpiece at which the laser beam is concentrated.

2. A method in accordance with claim 1, wherein said directing step comprises, enclosing the path of the laser beam in a tube, introducing said gas into the tube and thereafter introducing the liquid coolant into said gas.

* * * * *